United States Patent
Hassel et al.

(10) Patent No.: US 6,832,622 B2
(45) Date of Patent: Dec. 21, 2004

(54) SYSTEM FOR AUTOMATIC PROCESSING OF FLUIDS USING COMBINABLE AND INTERCHANGEABLE PROCESS MODULES

(75) Inventors: Joerg Hassel, Erlangen (DE); Arno Steckenborn, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 339 days.

(21) Appl. No.: 10/145,137

(22) Filed: May 15, 2002

(65) Prior Publication Data

US 2002/0186666 A1 Dec. 12, 2002

Related U.S. Application Data

(63) Continuation of application No. PCT/DE00/03994, filed on Nov. 13, 2000.

(30) Foreign Application Priority Data

Nov. 15, 1999 (DE) .......................................... 199 54 855

(51) Int. Cl.[7] .............................. F17D 1/00; B01J 19/00
(52) U.S. Cl. ........................................ 137/269; 137/884
(58) Field of Search ................................ 137/269, 271, 137/884

(56) References Cited

U.S. PATENT DOCUMENTS

| 4,965,880 | A | 10/1990 | Petitjean |
| 5,083,364 | A | 1/1992 | Olbrich et al. |
| 5,519,635 | A | 5/1996 | Miyake et al. |
| 5,580,523 | A | 12/1996 | Bard |
| 6,179,006 | B1 * | 1/2001 | Stoll et al. ................... 137/884 |
| 6,763,848 | B2 * | 7/2004 | Rondreux et al. ........... 137/269 |

FOREIGN PATENT DOCUMENTS

| DE | 30 46 268 A1 | 7/1982 |
| EP | 0 303 565 A1 | 2/1989 |
| EP | 0 955 473 A1 | 11/1999 |

OTHER PUBLICATIONS

Van Den Berg et al., "Modular Concept For Miniature Chemical Systems" Dechema Monographs, Verlag Chemie, Weinheim, De., vol. 132, 1995, pp. 109–123.

Zdeblick et al., "Thermopneumatically Actuated Microvalves and Integrated Electro–Fluidic Circuits", Technical Digest, IEEE Solid–State Sensor & Actuator Workshop, New York, NY, Jun. 1994, pp. 251–255.

* cited by examiner

Primary Examiner—Kevin Lee
(74) Attorney, Agent, or Firm—Sughrue Mion, PLLC

(57) ABSTRACT

A system for carrying out the automated processing of fluids. The system has combinable and interchangeable process modules (38, 39, 40), which each contain a control unit (6) and a fluid unit (7) that can be controlled by the control unit in order to execute a module-specific process function. The control units (6) are interconnected via a data bus (10) which is shared by process modules (38, 39, 40), and the fluid units (7) are interconnected via a fluid bus (44) having a number of channels (45). The configuration of at least one portion of the channels (45) of the fluid buses (44) can be varied in the areas of their respective connection to the fluid units (7) by using configuration devices, which can be provided in the form of adapters (41, 42, 43) located between the process modules (38, 39, 40) and the fluid bus (44).

16 Claims, 5 Drawing Sheets

SYSTEM FOR AUTOMATIC PROCESSING OF FLUIDS USING COMBINABLE AND INTERCHANGEABLE PROCESS MODULES

This is a Continuation of International Application PCT/DE00/03994, with an international filing date of Nov. 13, 2000, which was published under PCT Article 21(2) in German, and the disclosure of which is incorporated into this application by reference.

FIELD OF THE INVENTION

The invention relates generally to a system used in the field of automated processing of fluids. In particular, the invention relates to a system for the automated processing of fluids using combinable and interchangeable process modules.

BACKGROUND OF THE INVENTION

U.S. Pat. No. 5,083,364 discloses a system for producing semiconductor substrates, which consists of a plurality of aligned process modules. The process modules are supplied with data, energy and the required chemicals, gases and liquids via a shared media bus. The fluids are also discharged via the media bus. At least one of the process modules is configured for feeding the fluids into a fluid bus or discharging the fluids. The media bus has electric lines for data and energy transmission and also has various pipes for carrying the different fluids. At a grid spacing defined by the size of the process modules, terminal boxes with electrical connections and fluid connections are provided along the media bus to which the individual process modules can be connected by means of corresponding mating connections. The fluid connections are equipped with self-closing valves, which outwardly seal the corresponding fluid connection if it is not connected to a respective mating connection of a process module. Within the prior art system disclosed in U.S. Pat. No. 5,083,364, individual process modules can be comparatively easily added, removed or replaced as required.

The fluid bus of this prior art system is configured especially for the fluids required for the production of semiconductor substrates and for this purpose, the system is equipped with various pipes, which, in some cases, have different diameters and cross sections. The variability and applicability of this prior art system is therefore limited specifically to the production process of semiconductor substrates.

EP-A-0 303 565 discloses a system for producing a chemical product. Different production steps are carried out in respective fixed or mobile process modules, which each comprise a control unit and a chemical unit. The corresponding production step for each process module is carried out in the respective chemical unit and controlled by the control unit. The control units of the different process modules are connected to a process control system via data lines. The materials required or accumulated during production are supplied to or discharged from the individual chemical units within the process modules via supply and discharge lines. Thus, modularity and flexibility are essentially achieved on the control side, but not on the process side.

OBJECTS OF THE INVENTION

An object of the present invention is to provide a system for the automated processing of fluids and which provides improved modularity and corresponding flexibility.

SUMMARY OF THE INVENTION

In accordance with the invention, the above and other objects are attained by the provision of a system for automated processing of fluids, the system having combinable, interchangeable process modules. Each process module includes a control unit and a fluid unit that can be controlled by the control unit to execute a module-specific process function within the context of the processing of the fluids. The control units are interconnected via a data bus, which is shared by the process modules, and the fluid units are interconnected via a fluid bus which comprises a plurality of channels. The configuration of at least one portion of the channels of the fluid bus can be varied by using a configuration device in the area of the connections of the fluid bus with the fluid units. Processing of fluids should be understood, in particular, as the analysis or synthesis of fluids, including the required secondary functions. These fluids can be liquids, gases, or solids transported by using carrier fluids.

Due to the adjustability of the channel configuration in the connection areas of individual process modules with the fluid bus, extensive modularity and flexibility of the inventive system is ensured not only on the control side but also on the process side, since, in contrast to the prior art systems, the channels are not pre-assigned. For instance, depending on the configuration settings, fluid units of the same type of process modules can be connected with different channels of the fluid bus as required. Preferably, individual channel segments between adjacent process modules can be shut off using the configuration devices so that, for instance, a channel located on both sides of a particular process module can be occupied with different fluids. Furthermore, individual channels between different predefined process modules can be occupied with a fluid in segments depending on the respective channel configuration set in their area. Individual channels or channel segments can also be connected in parallel to obtain a larger flow cross section.

The configuration devices can each be designed as adapters, which connect the corresponding process module to the fluid bus. Depending on the particular adapter used, this results in different interconnections between the channels of the incoming and the outgoing fluid bus and the fluid inlets and outlets of the fluid unit in the respective process module.

The adapter preferably comprises an information interface to the connected process module for transmitting information on the configuration settings to the intra-module control unit. The control unit is configured to forward this information via the data bus to a higher-level control unit and/or to the control units in the other process modules, respectively. The channel configuration settings are then, for instance, displayed on a visualization device of the higher level control unit or are available as information for the other process modules, such that misassignments of the channels, e.g., the unintended introduction of two different fluids into one and the same channel or channel segment can be detected. The information on the channel configuration that is set by the corresponding adapter is available, for instance, in the form of coding, which can be read by the control unit in the associated process module.

According to an alternative embodiment of the inventive system, the fluid bus is formed by internal fluid bus segments within a succession of process modules. The configuration devices are embodied as configuration modules, which can be inserted between individual process modules in the row of process modules. Depending on the configuration module used, this results in different interconnections of the channels of adjacent process modules.

Preferably, the configuration modules each have a configuration signaling unit connected to the data bus, which is used to transmit information on the configuration settings via the data bus to a higher level control unit and/or to the control units in the process modules. Consequently, the channel configuration settings are displayed, for instance, on a visualization device of the higher level control unit or are available as information to the process modules, so that any misassignments of the channels can be detected.

Finally, the configuration devices can also each be a component of at least individual process modules and can be controlled by the intra-module control unit to set the corresponding channel configuration. This makes it possible, e.g., from a central location, automatically to configure the entire fluid bus via the data bus and the control units in the individual process modules.

The controllable configuration device preferably has controllable valves along the course of the channels of the fluid bus and along the course of channel branchings to the corresponding fluid unit. One-way valves or multi-way valves combining the functions of several one-way valves may be provided.

The control units are preferably each designed to signal the configuration settings of the channels via the data bus to a higher level control unit that is connected to the data bus and/or to the control units in the respective other process modules. The channel configuration settings are then, for instance, displayed on a visualization device of the higher level control unit or are available as information to the respective other process modules, whose control units can then set the configurations of the channels that they control as a function of the configurations set in the respective other process modules. This makes it possible effectively to detect or prevent misassignments of the channels.

The fluid bus is preferably formed by internal fluid bus segments within the aligned process modules, such that it is automatically formed by the alignment of the process modules required to construct each system.

The fluid bus can at least in part be designed by using micro-system technology or a comparable technique. For example, starting from lithographic processes for structure transfer, a three-dimensional configuration, in this case of the channels, can be obtained by different micro-mechanical processes, e.g. anisotropic etching of silicon, micro-electroplating, laser processes, etc. Preferably, the configuration devices are likewise designed by micro-system technology.

To obtain a precise inter-connection of the individual fluid bus segments, particularly in view of the configuration of the fluid bus by micro-system technology, and, furthermore, to simplify the alignment of the various process modules, the process modules are preferably mounted on a common carrier, e.g., a top hat rail.

In accordance with yet another embodiment, a system for automated processing of fluids is provided, the system having a plurality of combinable, interchangeable process modules, each process module executing a different, respective module-specific process function. Also, each process module has a control unit operable to control the process module and a fluid unit controlled by the control unit to execute a unique respective module-specific process function. A shared data bus is connected to the control units and interconnects the control units associated with each respective process module. In accordance with this embodiment, a fluid bus is also provided which is connected to the fluid unit and which has a plurality of channels associated therewith. The fluid bus is operable to interconnect the fluid unit of each process module with other fluid units associated with other respective process modules. Also, a configuration device is provided to vary the configuration of at least one portion of the channels of the fluid bus. The configuration device has at least one valve for controlling a flow of a respective fluid from the fluid unit to the fluid bus or from the fluid bus to the fluid unit.

BRIEF DESCRIPTION OF THE DRAWINGS

For the further description of the invention, reference will be made to the figures in which.

DETAILED DESCRIPTION OF THE PREFERRED EMBODIMENTS

Figure 1:
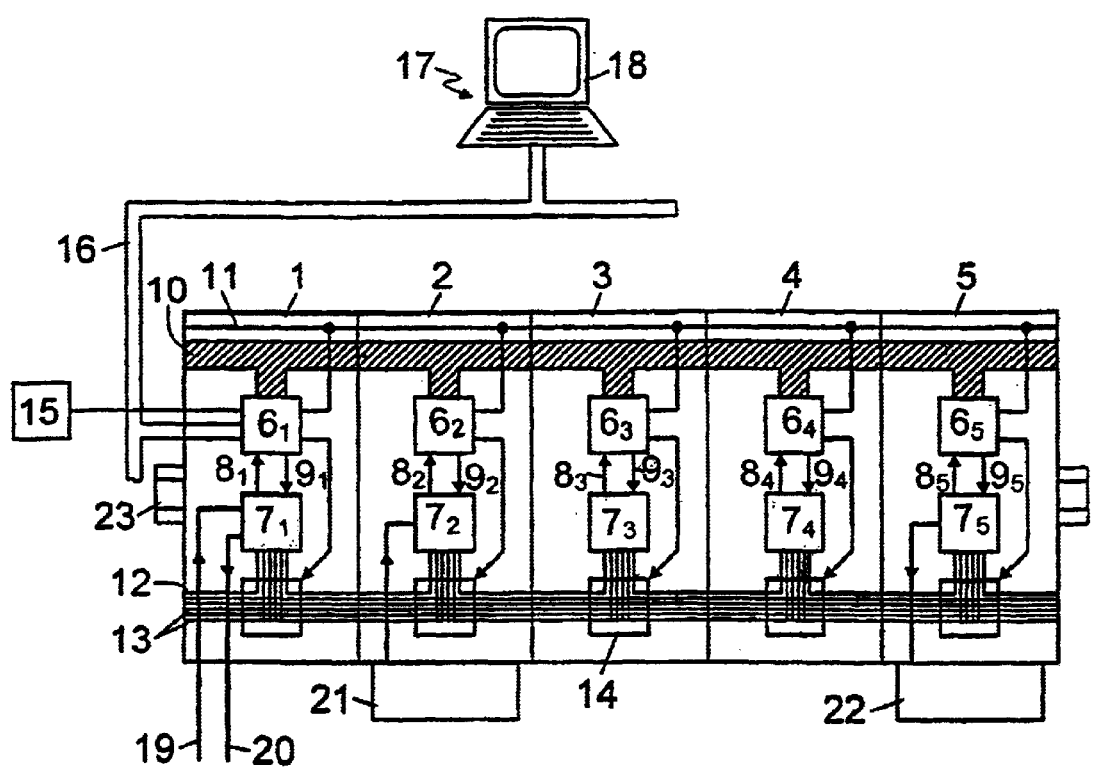
FIG. 1 is a simplified block diagram of a first exemplary embodiment of the inventive system formed by different process modules.

FIG. 1 shows a system for the automated processing of fluids, e.g., differing liquids or gases. Processing should be understood, for instance, as the analysis of the fluids or the synthesis by chemical reactions of fluids, including the required secondary functions, such as preparing, mixing, filtering, transporting, or pressurizing using pumps, heating, evaporating, etc. A system in accordance with the present invention includes various process modules connected in succession, 1–5, in each of which module-specific process functions are automatically executed. Depending on the aforementioned processing functions, process modules 1–5 can, for instance, be different types of analysis modules, reactor modules, e.g., with microreactors, pump modules, filter modules, energy supply modules, fluid supply and fluid discharge modules, etc. Each process module 1–5 has a respective control unit $6n$ (n being 1, 2, 3, 4 or 5) and a respective fluid unit $7n$. The actual process or treatment function each process module is performed within fluid unit $7n$ as a function of control signals $8n$ of control unit $6n$. Process signals $9n$, e.g., pressure values or analysis values that are recorded in fluid unit $7n$, are transmitted to control unit $6n$. Control units $6n$ in the various different process modules 1–5 are interconnected via a data bus 10 and a power supply bus 11. The fluid units $7n$ are interconnected via a fluid bus 12, which consists of a plurality of parallel channels 13 that conduct the required fluids. In the area of the connection of fluid bus 12 with the individual fluid units $7n$ in process modules 1–5, respective configuration devices 14, which can be controlled by control units $6n$, are provided. Each of these configuration devices are used to set the configuration of channels 13, as will be further described below.

Process modules 1–5, in addition to the connections with data bus 10, power supply bus 11, and fluid bus 12, can have further external connections. In the example shown, process module 1 serves to provide the basic functions for the system. For this purpose, control unit $6n$ is connected to a external power source 15 and, via a data connection, e.g. a external bus 16, to a higher-level control unit 17 with a visualization device 18. External fluid lines 19 and 20 are connected to fluid unit $7n$ to supply or discharge the required fluids to and from the system. For energy supply, a battery or fuel cell module (not shown) may also be considered as a alternative. In process module 2, for example, a fluid is fed into the system via supply reservoir 21, which can be connected to process module 2, whereas, a discharge reservoir 22 is connected, for instance, to process module 5 to receive a fluid that is discharged from the system.

As indicated schematically in the Figure, data bus 10, power supply bus 11 and fluid bus 12 are each formed by internal bus segments within the aligned process modules 1–5. Process modules 1–5 are mounted side by side on a common carrier, in this case a top hat rail 23. Buses 10–12 are formed by sliding or clipping the respectively required process modules 1–5 onto top hat rail 23. In the example shown in FIG. 1, five process modules are shown, however, more or less process modules can be used.

Figure 2:
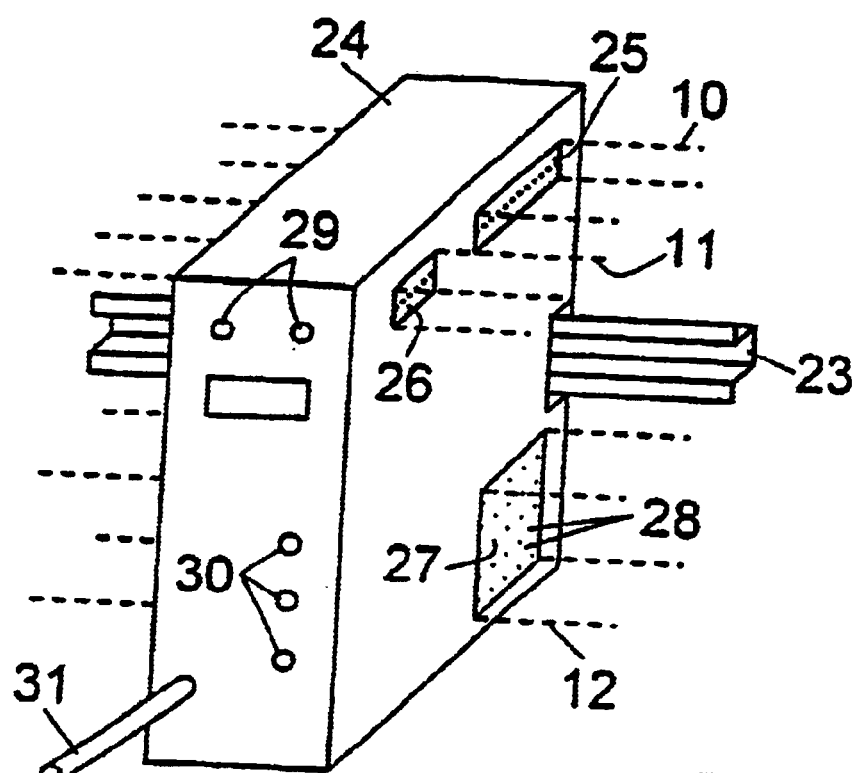
FIG. 2 shows an example of one of the process modules.

FIG. 2 shows a example of a individual process module 24, which is slid onto top hat rail 23 and has laterally formed bus interfaces 25, 26, and 27 to connect the internal bus segments (not depicted) with those of each adjacent process module to form data bus 10, power supply bus 11, and fluid bus 12, respectively.

Bus interface 27 for fluid bus 12 is made by using micro system technology and has approximately 20 to 50 channel openings 28. As FIG. 2 further shows, the front face of process module 24 is provided with display elements 29 and control elements 30 to display and enter basic settings of process module 24. Also show by way of example is a external supply line 31 for feeding a fluid into the system formed by process module 24 and the other process modules, which are not depicted here.

Figure 3:
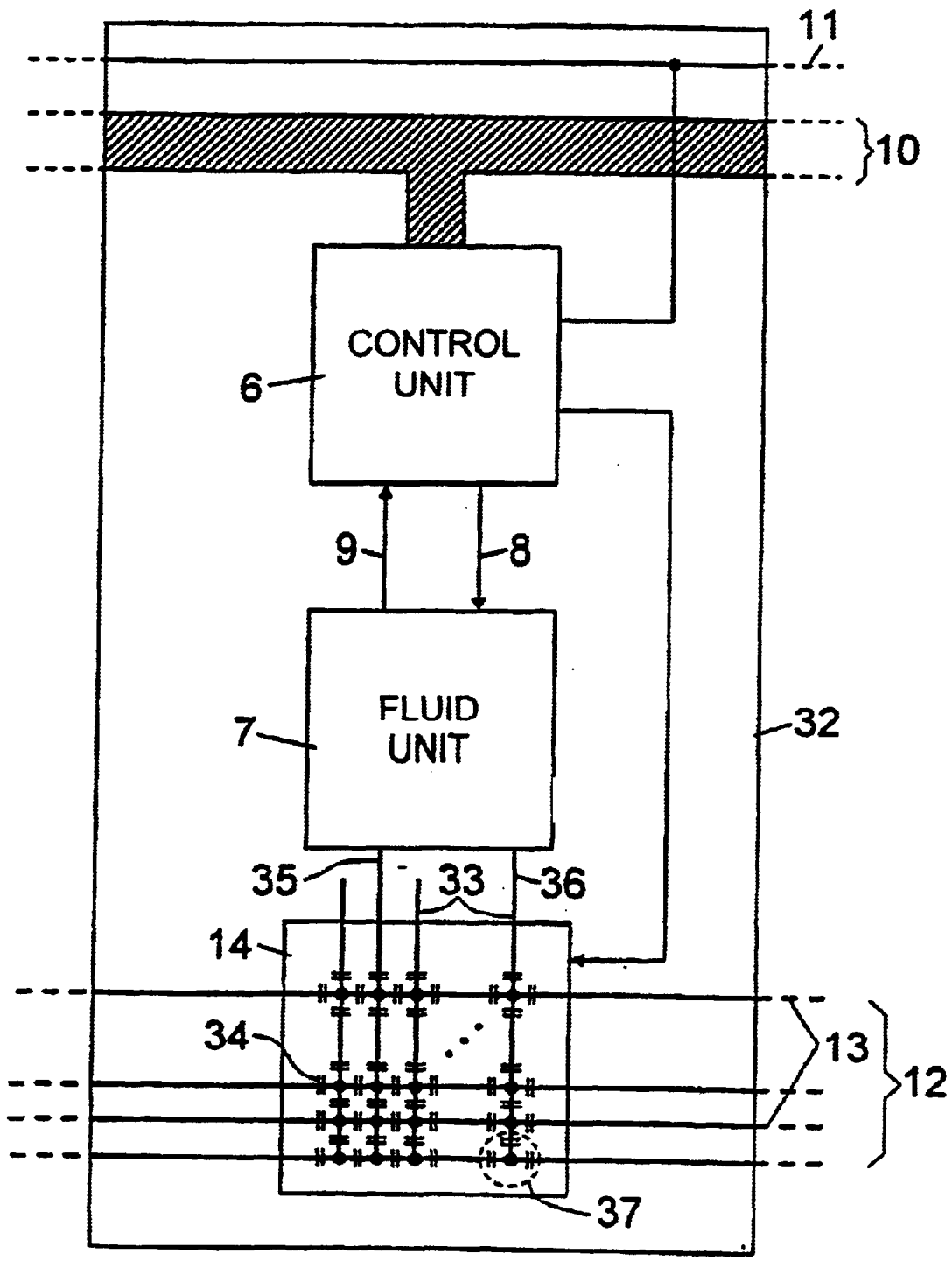
FIG. 3 is a block diagram, by way of example, of one of the process modules.

FIG. 3 shows a schematic block diagram of a process module 32 comprising a control unit 6, a fluid unit 7, a configuration device 14 and the bus segments of data bus 10, power supply bus 11, and fluid bus 12 with channels 13 formed within process module 32. The configuration device 14, along the course of channels 13 and along the course of channel branchings 33 to fluid unit 7, comprises controllable valves 34, which can be individually switched by control unit 6n and are made, for instance, by using micro-system technology. The configuration of channels 13 in the area of the connection of fluid bus 12 with fluid unit 7n can be adjusted by switching the valves 34, in order to connect predefined inlets and outlets 35, 36 of fluid unit 7n to predefinable channels 13, to block channel segments to the respectively adjacent process modules (not depicted), or to occupy sections of individual channels 13 between different process modules with a fluid. The setting of the configuration of channels 13 in process module 32 is signaled by control unit 6n via data bus 10 to the higher level control unit 17, where it is displayed on visualization device 18 to give an overview of the channel configuration of the entire fluid bus 12. The channels 13 of fluid bus 12 in each of the individual process modules 1–5, 24, 32 can be configured from control unit 17. The valves 34, as depicted here, can be embodied as one-way valves. Alternatively, a single multiway valve can replace several one-way valves, e.g. the valves labeled 37.

Figure 4:
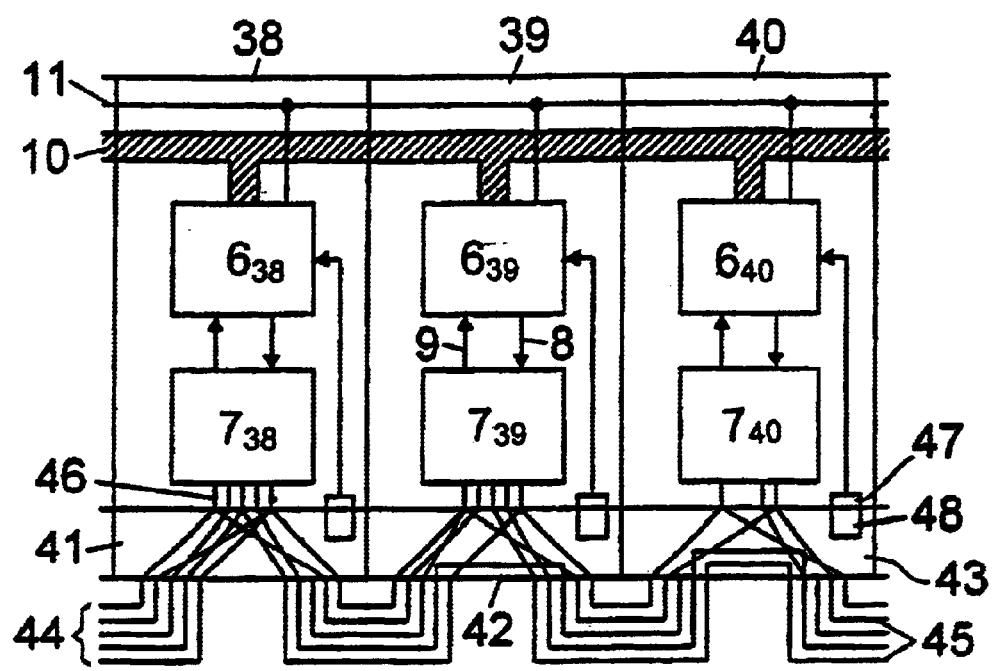
FIG. 4 is a second embodiment of the inventive system.

In the embodiment of the inventive system show in FIG. 4, process modules 38, 39 and 40, in accordance with the above-described examples, each have a respective control unit 6n and a respective fluid unit 7. The control units 6n are interconnected by a data bus 10 and a power supply bus 11. The configuration devices in this case are embodied as adapters 41–43 via which the process modules 38, 39 and 40 with their respective fluid units 7n are connected to a fluid bus 44. Depending on the adapter 41 to 43 used, this results in a different interconnection between channels 45 of the incoming and the outgoing fluid bus 44 and the fluid inlets and outlets 46 of fluid unit 7n in the corresponding process module 38 to 40. Each adapter, e.g. 43, has a information interface 47 to the connected process module, e.g. 40, to transmit information on the configuration settings to the intra-module control unit 6. Control unit 6n forwards this information in accordance with the example show in FIG. 1 via data bus 10 to a higher level control unit 17. The corresponding information in this case is stored, for instance, as coding in a chip 48 of adapter 43, such that control unit 6n can read this information via information interface 47.

Figure 5:
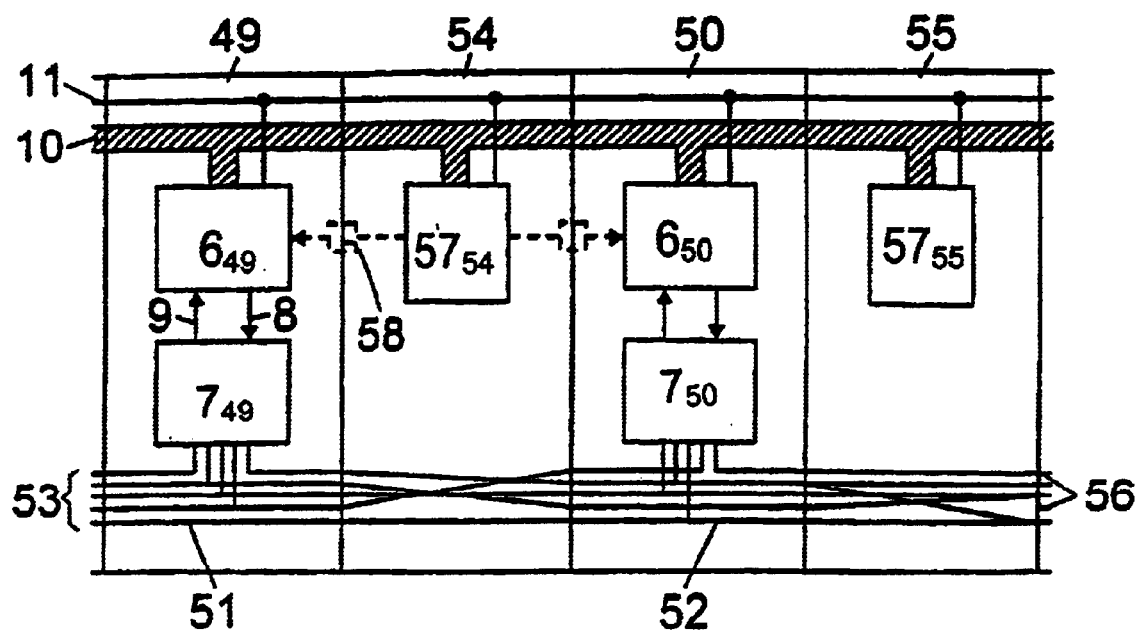
FIG. 5 is a third embodiment of the inventive system.

In the embodiment show in FIG. 5 of the inventive system, the process modules 49 and 50, in accordance with the above-described examples, each have a control unit 6n and a fluid unit 7. The control units 6n are again interconnected via a data bus 10 and a power supply bus 11. The fluid units 7n are connected to fluid bus segments 51 or 52 formed within process modules 49 and 50. The fluid bus segments 51 or 52 of all the aligned process modules 49 and 50 form the fluid bus 53 of the system. The configuration devices in this case are embodied as configuration modules 54 and 55, which can be inserted between individual process modules in the row of process modules, here 49 and 50. Depending on the configuration module 54 or 55 used, this results in a different interconnection of channels 56 of adjacent process modules 49 and 50.

The configuration modules 54 and 55 in this case each have a configuration signaling unit 57, which is connected to data bus 10, to transmit information regarding the configuration settings via data bus 10 to a higher level control unit (17, FIG. 1). As indicated by a dashed line, this information can alternatively or additionally be read as coding by control units 6n of the immediately adjacent process modules 49 or 50, analogous to the example described in FIG. 4, via information interface 58, and can subsequently be output to data bus 10.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A system for automated processing of fluids, the system comprising a plurality of combinable, interchangeable process modules, each operable to execute a respective module-specific process function, each process module comprising a respective control unit and a respective fluid unit controlled by the respective control unit to execute the respective module-specific process function, wherein the control units are interconnected via a data bus shared by each process module and the fluid units are interconnected via a fluid bus comprising a plurality of channels, and wherein at least one configuration device is arranged to vary the configuration of at least one portion of the channels of the fluid bus in areas of inter connection between the fluid bus and the fluid units.

2. A system as claimed in claim 1, wherein the configuration devices each comprise a adapter operable to connect a respective process module to the fluid bus.

3. A system as claimed in claim 2, wherein each adapter comprises an information interface connected to a respective process module, each adapter being operable to transmit information regarding a configuration setting to a respective control unit, and each control unit being operable to transmit the information via the data bus to at least one of a higher level control unit and other control units in the other process modules.

4. A system as claimed in claim 1, wherein the fluid bus comprises internal fluid bus segments within the process modules and the configuration devices comprise configuration modules inserted between individual process modules in a row of aligned process modules.

5. A system as claimed in claim 4, wherein the configuration modules each comprise a respective configuration signaling unit connected to the data bus, the configuration signaling units being operable to transmit information regarding a configuration setting via the data bus to at least one of a higher level control unit and the control units in the process modules.

6. A system as claimed in claim 1, wherein the configuration devices are respectively components of the process modules and are operable to be controlled by the respective control unit to set the configuration of the channels of the fluid bus.

7. A system as claimed in claim 6, wherein the configuration devices each comprise controllable valves along the course of the channels of the fluid bus and along the course of channel branchings to the respective fluid unit.

8. A system as claimed in claim 6, wherein the control units are each operable to provide the configuration setting of the channels via the data bus to at least one of a higher level control unit and the control units in the respective other process modules.

9. A system as claimed in claim 8, wherein the control units are each operable to control the configuration of at least the portion of the channels as a function of the configurations provided by the control units of the respective other process modules.

10. A system as claimed in claim 6, wherein the fluid bus is formed by successively connected internal fluid bus segments respectively within the process modules.

11. A system as claimed in claim 1, wherein individual channel segments between adjacent process modules can be disconnected by the configuration devices.

12. A system as claimed in claim 1, wherein sections of individual channels between different predefined process modules can be occupied by a fluid by operation of the configuration devices.

13. A system as claimed in claim 1, wherein the fluid bus is formed, at least in part, using micro-system technology.

14. A system as claimed in claim 1, wherein the configuration devices are formed using micro-system technology.

15. A system as claimed in claim 1, wherein the process modules are aligned and mounted on a common carrier.

16. A system for automated processing of fluids, the system having a plurality of combinable, interchangeable process modules, each process module being operable to execute a different respective module-specific process function and each process module comprising:

a control unit operable to control the process module;

a fluid unit controlled by said control unit and operable to execute a unique respective module-specific process function;

a shared data bus connected to said control unit and operable to interconnect said control unit and other control units associated with other respective process modules;

a fluid bus connected to said fluid unit and having a plurality of channels, said fluid bus being operable to interconnect said fluid unit with other fluid units associated with other respective process modules; and a configuration device operable to vary the configuration of at least one portion of the channels of said fluid bus, wherein said configuration device comprises at least one valve controlling a flow of a respective fluid from said fluid unit to said fluid bus or from said fluid bus to said fluid unit.

* * * * *